(12) United States Patent
Rowe et al.

(10) Patent No.: US 8,265,241 B2
(45) Date of Patent: Sep. 11, 2012

(54) APPARATUS FOR CITIZEN REQUESTS FOR ASSISTANCE

(76) Inventors: Roger A. Rowe, New York, NY (US); Karl Turkel, New York, NY (US)

( * ) Notice: Subject to any disclaimer, the term of this patent is extended or adjusted under 35 U.S.C. 154(b) by 1071 days.

(21) Appl. No.: 12/027,674

(22) Filed: Feb. 7, 2008
(Under 37 CFR 1.47)

(65) Prior Publication Data
US 2008/0304641 A1 Dec. 11, 2008

Related U.S. Application Data

(60) Provisional application No. 60/900,045, filed on Feb. 7, 2007.

(51) Int. Cl.
*H04M 15/00* (2006.01)
*H04N 7/14* (2006.01)
*G10L 15/00* (2006.01)
*G06Q 30/00* (2012.01)

(52) U.S. Cl. ............... 379/111; 345/173; 348/14.11; 370/352; 379/37; 379/93.22; 379/143; 379/155; 379/453; 382/218; 600/365; 705/14.41; 715/810

(58) Field of Classification Search ............ 345/173; 348/14.11; 379/37, 88.02, 93.22, 111, 114.2, 379/143, 144.02, 144.05, 155, 419, 453; 600/365; 705/14.41; 715/810; 370/352; 382/218
See application file for complete search history.

(56) References Cited

U.S. PATENT DOCUMENTS

| | | | |
|---|---|---|---|
| 3,621,398 A | 11/1971 | Willis | 325/119 |
| 3,633,106 A | 1/1972 | Willis | 325/185 |
| 5,046,183 A * | 9/1991 | Dorst et al. | 379/144.02 |
| 5,283,546 A | 2/1994 | Scop et al. | 340/287 |
| 5,515,424 A * | 5/1996 | Kenney | 379/93.22 |
| 5,550,564 A * | 8/1996 | Cragun | 345/173 |
| 5,586,171 A * | 12/1996 | McAllister et al. | 379/88.02 |
| 5,784,456 A * | 7/1998 | Carey et al. | 379/419 |
| 5,835,130 A * | 11/1998 | Read et al. | 348/14.11 |
| 5,881,141 A * | 3/1999 | Park | 379/155 |
| 6,060,979 A | 5/2000 | Eichsteadt | 340/287 |
| 6,320,946 B1 * | 11/2001 | Enzmann et al. | 379/143 |
| 6,323,884 B1 * | 11/2001 | Bird et al. | 715/810 |
| 6,374,176 B1 | 4/2002 | Schmier et al. | 701/200 |
| 6,577,720 B1 * | 6/2003 | Sutter | 379/144.05 |
| 6,693,534 B2 | 2/2004 | Costa et al. | 340/531 |
| 7,050,554 B2 * | 5/2006 | Parfait et al. | 379/114.2 |
| 2002/0089971 A1 * | 7/2002 | Shih | 370/352 |
| 2004/0019582 A1 | 1/2004 | Brown | 707/1 |
| 2005/0137754 A1 | 6/2005 | Bartlett | 701/1 |
| 2005/0147238 A1 * | 7/2005 | Smith | 379/453 |
| 2005/0151639 A1 | 7/2005 | Bulmer | 340/531 |
| 2005/0190061 A1 | 9/2005 | Trela | 340/573.1 |

(Continued)

*Primary Examiner* — Gerald Gauthier
(74) *Attorney, Agent, or Firm* — Whitaker Chalk Swindle & Schwartz PLLC; Stephen S. Mosher

(57) ABSTRACT

A method and system for initiating an incident-specific request for assistance from a citizen call station by touching a sequence of positions on a display screen. The citizen call station comprises a display having a touch-responsive mechanism for entering a call sequence of statements including initiating an alert, reporting a concern, and selecting help needed. A transmission mechanism for transmitting the call sequence to a control location is provided. A confirmation of the request, sent from the control location, may be received at the call station. The call station may also deliver information from a central location. The call station may include cameras, various sensors, two-way communications, and may be used to provide information on demand, outside of the normal security concerns.

20 Claims, 11 Drawing Sheets

U.S. PATENT DOCUMENTS

| | | |
|---|---|---|
| 2005/0212677 A1 | 9/2005 | Byrne et al. .................. 340/574 |
| 2005/0242944 A1 | 11/2005 | Bankert et al. ................ 340/531 |
| 2008/0004953 A1* | 1/2008 | Ma et al. ......................... 705/14 |
| 2008/0304628 A1* | 12/2008 | Rowe et al. ..................... 379/37 |
| 2008/0304641 A1* | 12/2008 | Rowe et al. ................... 379/111 |
| 2011/0251472 A1* | 10/2011 | Weinert et al. ................ 600/365 |

* cited by examiner

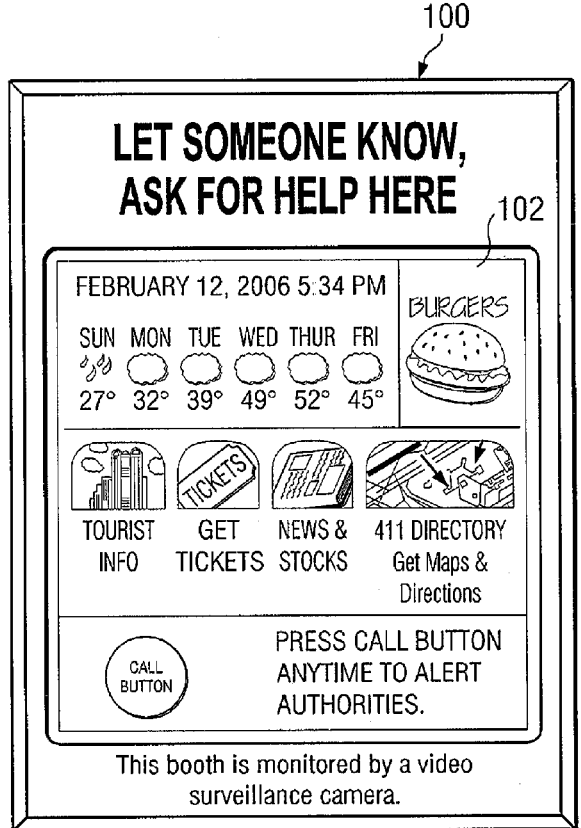
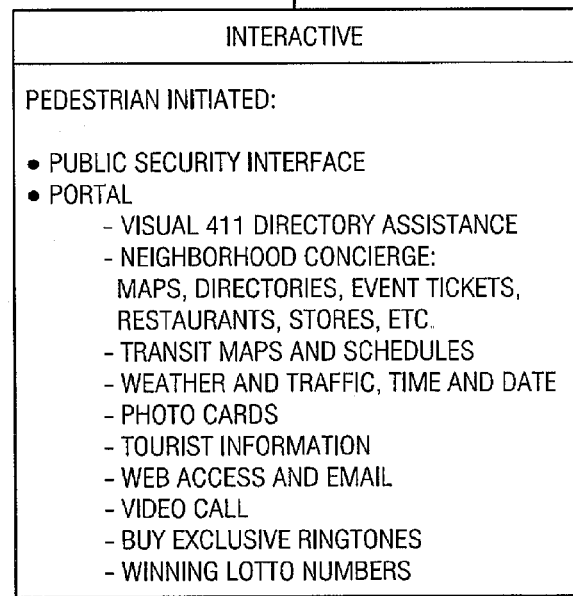
FIG. 8C
FIG. 9A

APPARATUS FOR CITIZEN REQUESTS FOR ASSISTANCE

CROSS REFERENCE TO RELATED PATENT APPLICATIONS

The present application claims priority in U.S. Provisional Patent Application Ser. No. 60/900,045, filed Feb. 7, 2007 and entitled "SYSTEM AND METHOD FOR CITIZENS REQUEST FOR ASSISTANCE."

This patent application is related to co-pending U.S. patent application Ser. No. 12/027,653, filed by the same applicants and entitled "SYSTEM AND METHOD FOR CITIZEN REQUESTS FOR ASSISTANCE."

BACKGROUND OF THE INVENTION

1. Field of the Invention

The present invention generally relates to apparatus and methods for enhancing public safety and, more particularly, to interactive citizen call station technology operating to provide improved communication about emergencies and situations of public concern, improved communication between citizens and civil authorities such as municipal governments, and enhanced responses by public safety and response units to such concerns.

2. Background of the Invention and Description of the Prior Art

Communication systems and devices for summoning aid to persons in need of assistance in emergency situations have long been available. Fire alarms, police call boxes, and telephone systems are well known examples of traditional systems and procedures. In recent years the establishment of the "911" universal number in the United States for requesting emergency services has proven to be an effective way to request emergency services and assistance. The 911 service provides direct access to a wide variety of specific services through voice contact with a dispatcher who facilitates the selection of the needed service or assistance. With the widespread use of cellular telephones, the 911 system has enabled much improved access to services because of the mobility of the telephones. Cellular telephone users on or very near the scene of an emergency situation enable a link to be quickly established with public safety and other potential responding services.

One weakness of the foregoing system is that a caller must engage in a dialogue with the dispatcher before a decision can be made to select the appropriate agency. In the event of high background noise, impairment of speech, communications interference, a lack of time to explain details of a situation, or the lack of emergency calling devices in public transportation vehicles, such dialogue may be impossible or seriously impaired, preventing the prompt and appropriate response to an incident. The problem is particularly acute in public transportation vehicles, which typically lack any kind of communication equipment useable by passengers, yet are often exposed to, or are the site of, emergency situations, particularly in large metropolitan areas.

Present communication and emergency alert systems also tend to be limited in capability, either as to information capacity or because they are designed for a specific type of emergency. Further, most such systems allow communication only in one direction, to an agency associated with the particular kind of incident. An example is a fire alarm, typically a small box mounted on a wall or post that permits an alert to be sent by a witness to a fire.

Another deficiency of presently available systems is the lack of efficient and user-friendly systems for communicating information from civil authorities and their various agencies to citizens, particularly when location-specific information must be made known quickly and clearly in case of emergencies. Yet another deficiency of presently available systems is that much information of interest to consumers is primarily limited to radio or TV or computer network media, broadcast media, print media, billboards, etc. Moreover, there is little availability of agency-to-citizen communication that is targeted to specific citizen locations yet also widely available.

In the prior art, various attempts have been made to provide devices for alerting emergency service providers of the need for their services, or for providing communication during emergency situations.

For example, U.S. Patent Application Publication No. 2005/0137754, Bartlett, discloses "targets on a touch panel overlay" on a transit stop display panel for implementing buttons to select a transit vehicle from the transit stop so that a transit vehicle operator knows a patron is waiting, etc. Also disclosed is a pushbutton to initiate emergency calls. U.S. Patent Application Publication No. 2005/0151639, Bulmer, discloses a broadcast system for alerting the public of an emergency or criminal situation that includes the ability for the public to provide tips via telephone or e-mail hotline from the vicinity of the incident. U.S. Patent Application Publication No. 2005/0190061, Trela, discloses a wireless, Internet-based intelligence sharing system for distributing information pertinent to homeland security to transportation terminals, for monitoring human behaviors at such terminals, and for reporting potential terrorist activities or other threats to homeland peace. Also disclosed is an "e-911 calling wand" enabling a one-button 911 call or terrorist report after removing the wand from a housing. The wand may include "touch pad" controls for requesting a function.

In other examples, U.S. Patent Application Publication No. 2005/0212677, Byrne et al., discloses an alarm and communication system for a building that enables first responders to know the location of occupants needing assistance. A user interface with a touch screen display enables occupants to navigate through screens to engage voice evacuation functions and floor plans to identify escape routes from the building. U.S. Patent Application Publication No. 2005/0242944, Bankert et al., discloses a security alert system for a building that connects remote stations in the building with a central control and monitor station that communicates public emergency warnings to the remote stations. The remote stations include a display, e.g, LCD, for receiving messages, and a user interface having a plurality of input keys, e.g., touch sensitive portions of the display, for two-way communication. A beacon unit associated with each remote station or building and controlled from either a remote station or central control provides a guide signal to locate an area of interest.

What is needed is a communication or call station type of system that can be installed in readily accessible public locations or passenger vehicles of public transportation systems, such as buses and trains. Such a system must enable fast reporting of an emergency incident coupled with a request for appropriate assistance without the necessity of a dialogue with a dispatcher. Such a system should be able to provide safety-related information about the location of the call station to appropriate agencies as well as providing instruction about the presence of a safety matter to the call station location for use by persons present there. Moreover, such a system, for maximum utility, must enable two-way communication to permit the exchange of safety information and to provide for the communication of useful consumer and commercial information when needed.

SUMMARY OF THE INVENTION

A solution to the disadvantages of the presently available emergency assistance systems and methods as outlined in the foregoing must be intuitive, self-prompting, and enable both fast reporting of an emergency incident with the request for appropriate assistance without the necessity of a dialogue with a dispatcher. The availability of wireless, high speed data communications technology, in combination with low cost computers, software, touch responsive displays (also known as touch sensitive displays), and other interface equipment, makes it possible to produce an intelligent, low cost communication station or call station type device for installation in every location of a public telephone station and in every passenger compartment of a commuter train or bus or other public transit vehicle.

Accordingly an apparatus, system, and method are described that eliminate the need for dialogue with a dispatcher or response unit during the request for assistance. Such a system, based on the idea that "If you see something, say something," which provides for entering pre-stated messages on a touch screen panel, enables citizens to communicate an emergency need in a simple, straightforward way. The system disclosed provides rapid dispatch of emergency services appropriate to the type of incident by activating a readily accessible device that is only a few steps away or is within the passenger compartments of public transportation vehicles. The apparatus may also be installed in street corner kiosks, bus stops and train stations, air terminals, convention centers, parking garages, and numerous other public facilities.

Thus, a method of requesting assistance from an emergency services provider is disclosed comprising the steps of: touching a button image corresponding to a call for assistance that is displayed on a touch sensitive display of a call station permanently mounted in a public location near the location of an incident requiring assistance; reporting a type of incident by touching a corresponding type of incident descriptor that is displayed on the touch sensitive display; and selecting a type of assistance needed by touching a corresponding icon that is displayed on the touch sensitive display. Each time the appropriate location on a touch-responsive screen is touched, corresponding to a displayed object or statement, the display advances to the next step in the sequence of entering the emergency request for assistance.

In another aspect of the invention, the method includes the step of sending a message confirming the request for assistance, from a central location via a communication network connected to the call station in response to selecting a type of assistance transmitted from the call station. The method further includes the step of observing a message confirming the request for assistance that is displayed on the touch sensitive display in response to selecting the type of assistance needed.

In yet another aspect of the present invention, a security network system for communicating with emergency services providers via respective connections to the Internet is disclosed comprising a data center including a web server coupled to the Internet via a client server; and a plurality of citizen call stations distributed throughout an urban environment and accessible by the public via a touch-sensitive display screen coupled to each call station, the call stations further coupled via at least one communications interface through the Internet to the client server in the data center, wherein an incident-specific request for assistance may be initiated from the citizen call station by touching a sequence of positions on the display screen, and transmitted automatically to an emergency service provider, followed by a confirming message transmitted to the citizen call station and displayed on the display screen.

In a further aspect, the data center further comprises at least one database coupled to the web server via a streaming server; and a central controller coupled to the web server.

In another aspect, a call center having a plurality of work stations is provided and coupled to the web server in the data center.

Moreover, a citizen call station is disclosed, comprising a housing and a video display having a touch-responsive surface for entering a predetermined and displayed call sequence of statements including initiating an alert, selecting a concern, and selecting help needed; and a communication mechanism for transmitting the call sequence to a control location.

In one aspect, the concern is selected from the group consisting of person in distress, suspicious person, suspicious package, unlawful activity, and safety concern, and the help needed is selected from the group consisting of the fire department, a medical unit, a police department unit, hazmat teams, evacuation units, water department units, and the like. In another aspect, a displayed message acknowledges receipt of the transmitted call sequence, that the call sequence has been received and the requested help is on the way.

In other aspects, a camera provides a live video feed of activity in the vicinity of the video display associated with the entered call sequence.

In yet another aspect, the communication mechanism includes a communication network connecting the call station and the control location, enabling two-way communication.

In yet another aspect, the call station may be equipped with sensors to detect the presence of persons through motion or video or audio sensing devices, the quality of the air, the presence in the vicinity of hazardous materials, chemical, biological, or radiological substances, radiation, etc.

In yet another aspect, the call station and the associated system of infrastructure provide information on demand services that may be of interest to consumers and commercial interests alike, outside of the normal security concerns. Examples include transportation and transit system information, tourist information, restaurant and lodging information, entertainment information, and the like.

BRIEF DESCRIPTION OF THE DRAWINGS

FIG. 8C illustrates a third embodiment of a central control initiated aspect of the security mode of operation of the system from the central control facility;

FIG. 9A illustrates one embodiment of an interactive, pedestrian initiated aspect of a consumer mode of operation of the system at the call station;

DETAILED DESCRIPTION OF THE INVENTION

Figure 1:
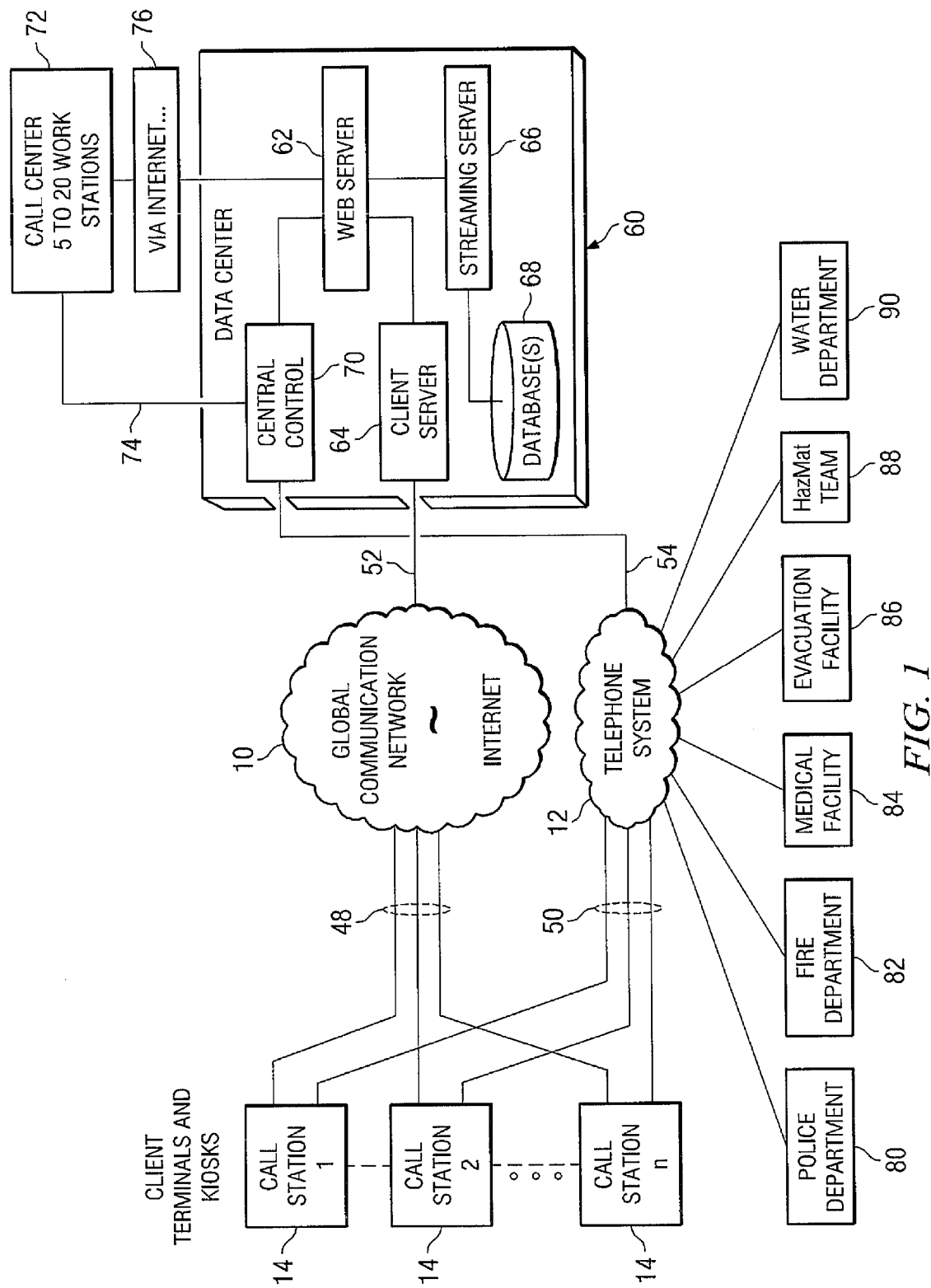
FIG. 1 illustrates a system block diagram of one embodiment of an emergency information system that utilizes a call station according to the present invention.

Briefly summarized, the present invention addresses the need for an apparatus, system, and method for providing communications services readily accessible at no cost to citizens in public places. Such apparatus, system, and method, which may generically be called an "urban communication system" or UCS, is specially adapted to requesting both non-emergency services and emergency services alike, and providing useful information on request about a wide variety of subject matter from many sources. A key component of the UCS includes a two-way communication device configured like a pedestrian call box—a citizen call station—and more particularly as a flat panel device mounted in a housing and affixed to a wall surface. It may be installed in a variety of locations such as phone booths, transit system passenger compartments in buses and trains, kiosks (indoor or outdoor) for commuters or tourists, directory panels, etc. The citizen call station or call box of the present invention may be advantageously connected to a global communications network ("GCN") such as the Internet and/or a standard telephone network (e.g., the Public Switched Telephone Network or "PSTN") to enable interaction with entities capable of providing the security, consumer, and commercial services and information that can be accessed from the call station.

The call station panel may be provided in several sizes and form factors to fit existing space requirements. For example a call station for a phone booth may be approximately 8" wide× 9" high, and a call station for use in a transit vehicle may be 12" to 18" wide×5" high. The panel includes a display (typically a liquid crystal display or LCD) about 6" wide×4" high," a loudspeaker, a microphone, and at least one video camera. The controls for operating the call station may be touch screen type—that is, the user merely touches a designated portion of the display surface, the designated portion being a specific object, icon, or graphic image associated with a legend or statement on the screen that corresponds with the desired instruction, request or command. Other types of touch-sensitive or touch-responsive display technologies may also be used.

Each call station may be constructed as a full function personal computer having a touch-sensitive flat panel display, one or more interfaces for connecting with a communications network, a GPS (Global Positioning System) receiver, and various types of input and output devices such as a microphone, loudspeaker, video camera, etc. The call station may further include various types of sensors to provide information about the environment in the vicinity of the call station. Examples of such sensors include motion detectors, air quality sensors, sensors to detect hazardous materials, chemicals, biological and radioactive agents, radiation hazards, etc. A keyboard may be provided as need on the touch-sensitive video display, depending on the mode of operation of the call station. There may be three modes of operation of the system in the illustrated embodiment: security, consumer, and commercial. The following description and the accompanying figures illustrate several embodiments of the uses and features provided in the call station or call box, and associated systems and networks disclosed herein.

The present invention is particularly adapted to deployment in heavily populated urban environments. In a large city for example, hundreds or thousands of these call stations may be installed and operated in a system utilizing existing infrastructure facilities, providing emergency, security, consumer, and commercial services in several modes—interactive, passive, centrally controlled, etc. To operate a call station in an emergency the user merely touches a "call button" on the panel or display, followed by touching the type of emergency service desired in a second step (person in distress; suspicious person; suspicious package; unlawful activity; safety concern; . . . see, e.g., FIG. 7). In a third step the user indicates the kind of emergency service provider (fire department, police department; a medical unit, a hazmat team, an evacuation unit, etc. . . . see FIG. 7) that is requested by touching a graphic image on the touch screen corresponding to the selected service. The "touch" buttons and associated commands are displayed objects, icons, or images on the graphic screen of the display having touch-sensitive switching control built-in, so that use of the system is intuitive and a minimum of user operations is required to send an alert, request and specify the type of assistance needed, etc.

Figure 7:
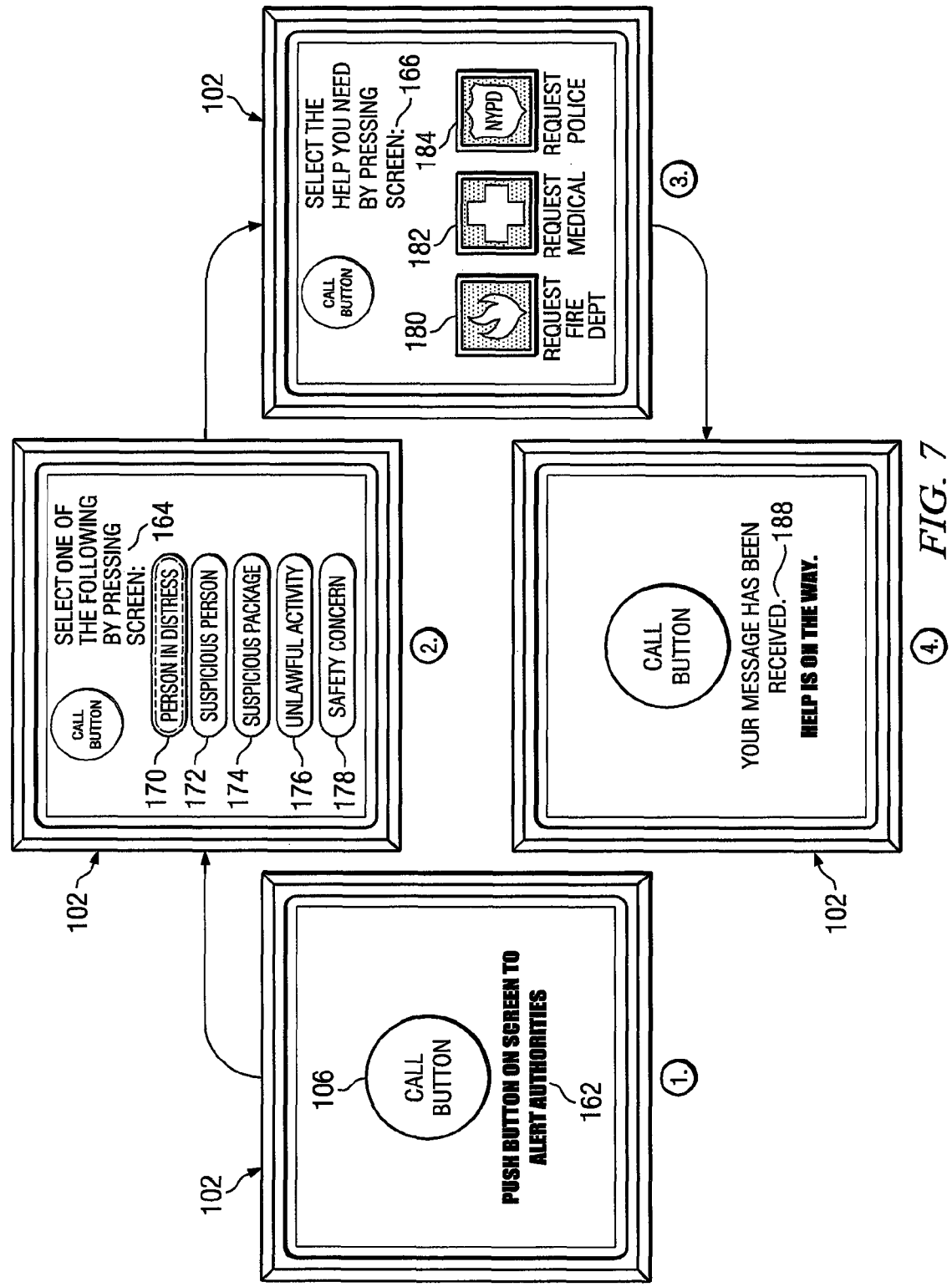
FIG. 7 illustrates one embodiment of a sequence of display images that appear on the call station screen of the embodiments of FIG. 2.

Thus, in this illustrative example, by entering a three-step call sequence of statements (see FIG. 7) corresponding to the need for services witnessed by the citizen at the scene of the incident being reported, the appropriate service can be quickly dispatched with little or no time wasted on explanations or other secondary information of limited value. The location of each call station may be known by its identifier, such as the telephone number of the telephone booth, an address code for a wireless terminal, or a location indicator such as a GPS satellite link and the like, enabling a response unit from the nearest location to be quickly dispatched to the scene. In a fourth step, an immediate acknowledgment message causes a corresponding displayed image to inform the calling user at the call station that the request has been received and the requested response is en route, as also shown in FIG. 7.

FIG. 1 illustrates a system block diagram of one embodiment of an emergency information system that utilizes a call box according to the present invention. As shown in FIG. 1, the system is configured for use with either or both of a global communications network (GCN) such as the Internet 10 or a telephone system network 12 such as the public switched telephone network ("PSTN"). A plurality (1, 2, . . . n) of individual citizen call stations 14 may be coupled through communication links 48 to the Internet 10 and/or the telephone system 12 through the communications links 50. The communications links 48, 50 may be WiFi or other wireless interface, or a wired interface. The Internet 10 enables connection of all of the call stations 14 to a data center 60. The telephone network 12 enables a dial up connection of all of the plurality of call stations 14 to various emergency service providers 80 through 90 as shown. Typical of the type of emergency service providers that may receive calls for assistance are the police department 80, the fire department 82, a medical facility 84, an evacuation facility 86, a hazmat team 88, and the water department 90.

The citizen call stations 14 are individually configured to be installed as permanent fixtures in numerous public locations, typically in a densely populated urban environment such as large cities. They may also be installed in public transit vehicles and stations in those cities having such facilities. In one example, the call stations may be installed in public telephone booths. It should be pointed out that any installed public facility that has access to AC power and the telephone network can be readily adapted with minimal reworking to install a call station according to the present invention described herein. This is one of the principle advantages of the invention—its adaptability to existing telephone infrastructure. This adaptability is particularly advantageous in large cities having thousands of public telephones already in use, readily available to pedestrian traffic. Moreover, the fact that the usage of many public telephones is diminishing, because of the predominance of the ubiquitous cell phones, presents an opportunity to seek ways to revive the utility of public telephones. The present invention, especially the call station apparatus disclosed herein, significantly reinvigorates the utility of the public telephone infrastructure by providing a simple, efficient way for citizens to contact emergency service providers, in an emergency, directly from the scene of the incident giving rise to the need for assistance. The benefits extend further to corporate entities that may choose to sponsor one or more call station installations, which can provide the funds necessary to upgrade the infrastructure and provide a very public way to present themselves as good public citizens because of their participation in making the invention available to the public. Such sponsors may also avail themselves of the many opportunities for advertising their products and services that are provided by the method and system of the two-way, non-emergency communication facilities of the present invention. This combination of features and advantages thus forms the basis for a completely new kind of media network.

In another example, the call stations may be installed inside the passenger compartments of public transit vehicles or the waiting or ticket station areas for the public transit systems. Such public transit vehicles may include buses, light rail cars, taxicabs, limousines, shuttle cars, and the like. A version of the call station, suitably adapted to aircraft specifications may even be installed in passenger aircraft to provide simple and rapid facilities for sending an emergency request for aid. The mention of these examples does not restrict the locations of the call stations to these locations but are merely illustrative of the type of installations that are suitable. Other examples may include waiting rooms in public buildings or housing, office buildings, transportation terminals, etc. The call stations may also be installed in purpose-built kiosks and located anywhere substantial citizen traffic, especially pedestrian traffic, is likely.

Continuing with FIG. 1, the data center 60 is configured as the operational hub for part of the functionality of the system. As will be described, information and communications flows though both the Internet and telephone networks. In one embodiment to be described, emergency communications may utilize the telephone network in areas where the well-known 911 system is operative but emergency communication through an Internet-based network is not yet available. Other embodiments may utilize the Internet or other global communications network to provide communication pathways for emergency needs. Some other embodiments may implement systems that rely on both types of networks to supply the communication links, while other systems may be configured to rely exclusively on the Internet to provide the communication of information and services of both emergency and non-emergency natures. Thus, while the data center 60 is primarily a unit of the Internet-based type of system, it may readily form the operational hub of systems that combine the functionality of both telephone and Internet networks. One example of the use of the combined networks is one that relies on the telephone system to provide communications for emergency assistance and relies on the Internet to provide communication of non-emergency information and services, either in response to requests or distributed by promotional or sponsoring interests or governmental agencies. Such a combined system is readily adaptable to present infrastructure, enabling implementation of the present invention without major rework of the infrastructure.

The data center 60 in general may include the following units that are well-known to persons skilled in the art. A web server 62 provides the basic unit of the data center 60. The web server 62 is coupled to a client server 64 to communicate with the call stations 14 through the Internet 10 via a link 52. The link 52 may be wired or wireless, as allowed by the particular infrastructure. The web server 62 is also coupled to a streaming server 66 to process requests for data from various files stored in a database 68 that is connected to the streaming server 66. The web server 62 may also be coupled with a central control block 70 for the regulation of traffic and utilization of data center resources depending on the responses required. The central control block 70 may be coupled to the telephone network 12 via the telephone link 54 to provide communication between the data center 60 and the various emergency service providers as described herein above. Also shown coupled to the web server 62 in the data center 60 is a call center 72 that may contain, in this example, 5 to 20 workstations for persons to respond to requests for assistance that require verbal communication with the requesting party. Other call centers may be organized having other numbers of workstations, other kinds and combinations of facilities, etc. The call center 72, which may in general be external to the data center 60, may, for example, be coupled to the data center 60 via the Internet 10 through a link 76, and may include a direct link 74 to the central control 70. Each of the links identified in and with the data center 60 are implemented by hardware and software readily available and known to persons skilled in the art, or, in certain applications, may be developed by such persons to accomplish particular functionalities not otherwise available.

One unique functionality provided by the present invention is the use of touch-responsive display panels at each of the call stations 14 to enable rapid, non-verbal but clearly stated entry of a request for emergency assistance. The request may be entered simply by touching the display screen of a call station 14 three times in sequence as prompted by the display images. Another unique functionality is the ability of the system to provide non-emergency information of interest and utility to citizens located at the call stations 14. Such information may be supplied through the facility provided by the data center 60 from promotional entities that sponsor the availability of the call stations 14 or from governmental agencies that can provide useful and timely information. This information may be provided with or without a request from someone at the call station 14 where the information is displayed.

Figure 2:
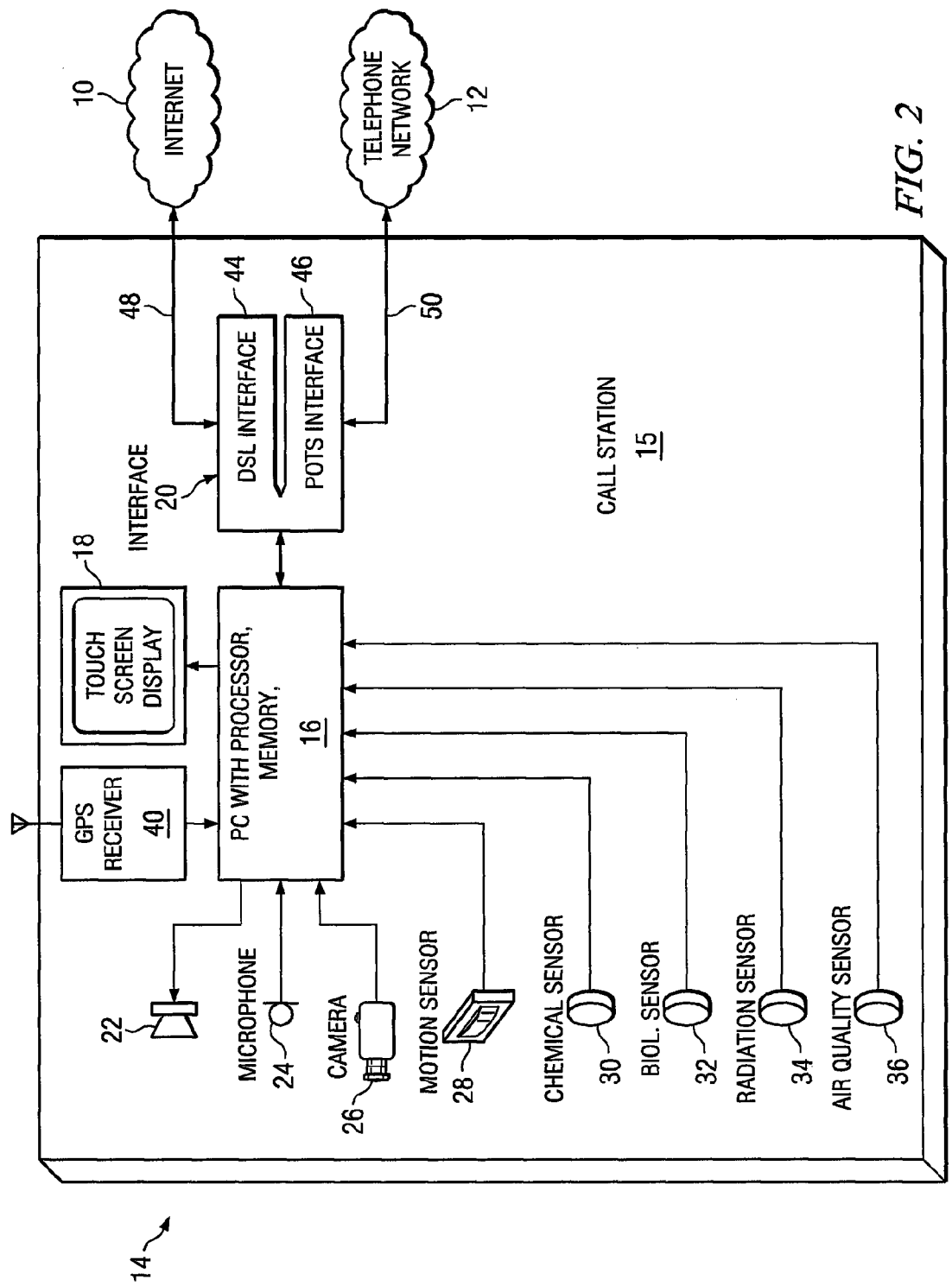
FIG. 2 illustrates a block diagram of one embodiment of a call station constructed according to the present invention.

FIG. 2 illustrates a block diagram of one embodiment of a call station 14 constructed according to the present invention. The reference number 15 denotes the housing structure for the call station 14. The housing structure 15 (or, simply, housing 15), which houses the internal components of the call station 14, may generally be a box, cabinet, or other enclosure mounted in a telephone booth or in the wall of a transit passenger vehicle as will be described. Details of the housing 15 are heavily dependent upon the particular choice of location for the call station 14 and will necessarily be dictated by that choice. The essential requirement of the housing 15 is to enclose the internal components and protect them from environmental conditions and tampering efforts. In some cases the housing 15 will be the structure of a phone booth (not shown in FIG. 2; but see, e.g., FIG. 5) or the structure of a light rail passenger car (not shown in FIG. 2; but see, e.g., FIG. 6).

Continuing with FIG. 2, The internal components of a call station 14 may include a personal computer or PC 16, including the requisite components thereof such as a processor, memory, I/O circuitry such as display control circuitry, audio and video circuitry, keyboard entry circuitry, the necessary operating system and application programs, etc. for operation as a communications terminal. Such hardware and software content is well known to persons skilled in the art and need not be further described herein. The call station further includes a touch-responsive or touch sensitive display screen 18 (also, touch screen display 18), which may typically be a liquid crystal display (LCD) or other equivalent display technology that enables response to touching the location of objects, icons, or images displayed on the screen to enter selections or instructions for proceeding through a sequence of operations or steps. The touch screen display 18 may preferably be configured as a flat panel to enable it to be installed in the wall of a phone booth or transit vehicle, for example, and present a compact appearance.

The PC 16, represented by the processor and its associated components, is also coupled to an interface 20 that includes interface circuitry for connecting the call station 14 to the Internet 10 and/or the telephone network 12. The interface 20 may thus include a modem and DSL (direct subscriber line) circuit 44 for connecting to the Internet 10 and a POTS (plain old telephone service) interface for connecting to the telephone network 12. Again, the circuitry of the interface is well known to persons skilled in the art and need not be described further herein. Also connected to the PC may be a number of sensors and input devices to enable the call station 14 to monitor situations and incidents occurring in the vicinity of the call station 14. For example, a loudspeaker 22 and microphone 24 may be provided to enable two-way voice communication with an emergency service provider 80-90 or a call center person associated with the data center 60. Sensors and other input devices that may be installed in the call station 14 may include a camera 26, a motion sensor 28, a chemical compound sensor 30 for detecting hazardous chemical substances such as volatile oxide compounds (VOCs) or solvent vapors, a biological organism sensor 32 for detecting harmful bacteria or viruses, a radiation detector 34 for detecting emissions of radioactive materials, and an air quality instrument for detecting the presence of air pollutants and measuring their concentration.

The foregoing examples are illustrative and not intended to be limiting. Associated with each type of sensor or instrument is circuitry for processing the signals produced by the particular device, converting them to data, and coupling them to the PC 16 for processing in the PC 16. Such circuitry may be located in the sensor unit or in the processor, PC 16. The sensors may, in general, be mounted on the panel of the call station 14 or in its housing 15. See, for example, FIG. 9C herein below. In some applications the sensor units may be mounted or located away from the call station 14 and supply their signals via a pair of wires or other communication link to the PC 16. The PC 16 may also, for example, be configured for processing location information provided from a GPS receiver 40 coupled to the PC 16 in the call station 14. The GPS (global positioning satellite) receiver, as is well known, provides precise geographical location data.

The call station 14, in a preferred embodiment, may include a camera 26 equipped with a variety of lenses (such as wide angle, zoom, etc.) or pan-and-tilt control, or, alternatively, the call station may include several wide-angle video cameras to provide a real time visual overview of the vicinity of the call station and the incident that is being reported. The cameras 26, which may be activated by the calling process or by remote control from the central control location in the data center 60, provide further detailed information via a live video feed to enable monitoring personnel at the central control location 70 or the call center 72 to assess the situation and modify the services needed or to monitor progress, etc. The cameras 26 may also be employed in surveillance operations as necessary.

Figure 3:
FIG. 3 illustrates an embodiment of a call station for use in a public telephone booth.

FIG. 3 illustrates an embodiment of a call station 14 for use in a public telephone booth. The drawing shows only a call station panel 100 that appears in the phone booth (see FIG. 5). The call station panel 100 is shown as a vertically-oriented rectangular surface that includes the touch screen display 102 displaying a graphic image 104. The graphic image 104 may include a red "call button" icon 106 in the center of an orange background and a message to the user of the call station 14 to "push button on screen to alert authorities." The call station panel 100 includes a legend 110 placed near the top portion of the panel that states one example of an invitation to using the call station 14 "LET SOMEONE KNOW, ASK FOR HELP HERE." The combination of this legend 110, the call button 106 and the simple instruction below the call button 106 is all that a person at the call station 14 needs to know to initiate a call for assistance. This panel configuration is the normal, quiescent condition of the call station 14, in readiness for immediate use in reporting an incident requiring assistance.

The panel 100 also includes a message space 108 in the lower part of the displayed image 104 that may be used to display the name of a promotional sponsor of the call station 14 or other information. This feature of the call station accommodates the interests of commercial or non-commercial entities in making the call stations available through sponsorships thereof by permitting them to provide promotional messages to the public as a public relations service, to provide advertising of products and services of potential interest to the public, etc. Often the space 108 may simply contain a logo or trademark or the name of the sponsoring entity. This feature is indicative of the kind of partnership between the owners of the telephone system infrastructure that may provide the phone booths for installing the call station 14 as a permanent feature of the phone booth. The call station 14 and the associated system of the present invention thus increases the utility of the phone booth and provides an additional potential source of revenue for its owner. In exchange for providing the space in the phone booth, and perhaps the installation and maintenance of the call station 14, the sponsoring entity can present its name or message in the space 108. This partnership type of arrangement is a key feature of securing the cooperation and acceptance that are necessary to make the system and method of the present invention widely available. As will be described herein, this combination has potential to enhance the communication of all kinds of useful and essential information in urban areas, particularly very large cities.

Figure 4:
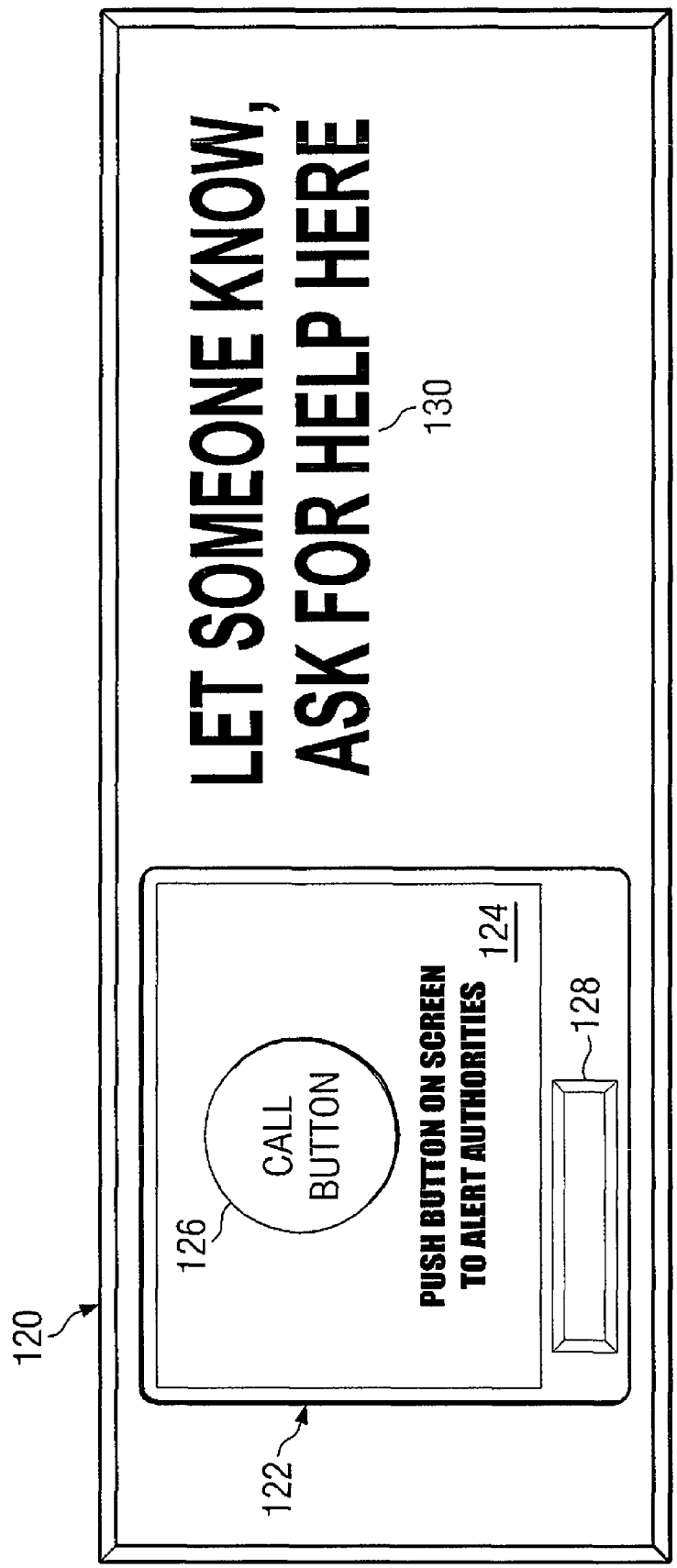
FIG. 4 illustrates an embodiment of a call station for use in the passenger compartment of a public transportation vehicle.
Figure 6:
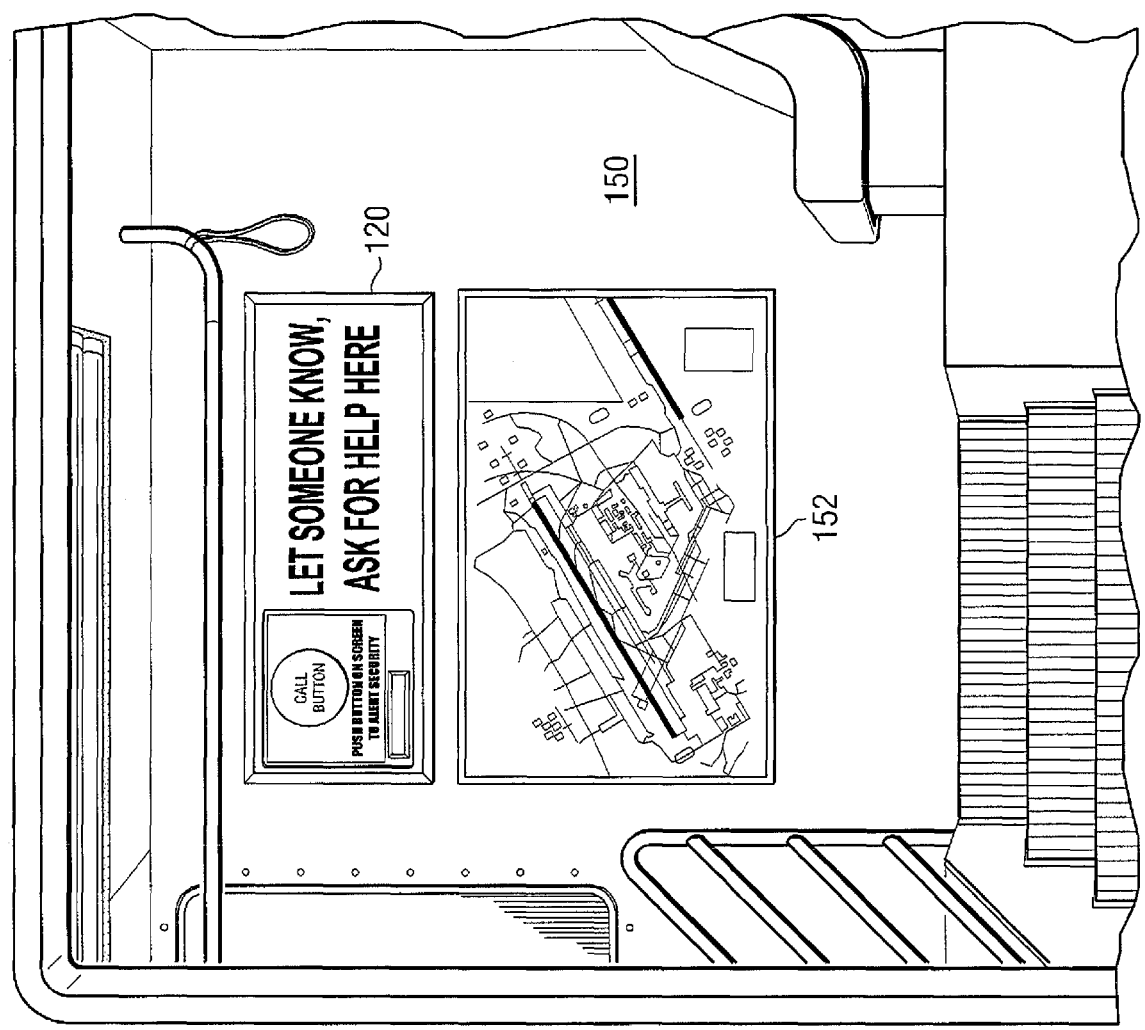
FIG. 6 illustrates a view of one embodiment of a call station according to the present invention as installed in the passenger compartment of a public transportation vehicle such as a subway car.

While a phone booth or other type of fixed, publicly located kiosk is a suitable type of public installation site for permanently installing the call station 14 of the present invention, there are certain mobile public facilities where such a call station capability may be advantageous. Accordingly, FIG. 4 illustrates an embodiment of a call station 14 that is very similar to the embodiment of FIG. 3 except that it is configured for use in a public transportation vehicle. The drawing shows only a call station panel 120 that appears in the passenger compartment of the transit vehicle (see FIG. 6, illustrating a portion of a light rail car). The call station panel 120 is shown as a horizontally-oriented rectangular surface that includes the touch screen display 122 displaying a graphic image 124. The graphic image 124 includes a red (for example) "call button" icon 126 in the center of an orange (for example) background and a message to the user of the call station 14 to "push button on screen to alert authorities." The call station panel 120 includes a legend 130 placed near the top portion of the panel that states one example of an invitation to using the call station 14 "LET SOMEONE KNOW, ASK FOR HELP HERE." The combination of this legend 130, the call button 126 and the simple instruction below the call button 126 is all that a person at the call station 14 needs to know to initiate a call for assistance. This panel configuration is the normal, quiescent condition of the call station 14, in readiness for immediate use in reporting an incident requiring assistance. As in the call station 14 of FIG. 3, which is configured for use in a phone booth, the panel 120 illustrated in FIG. 4 also includes a message space 128 in the lower part of the displayed image 124 that may be used to display the name of a promotional sponsor of the call station 14 or other information. This feature of the call station accommodates the interests of commercial or non-commercial entities in making the call stations available through sponsorships thereof by permitting them to provide promotional messages to the public as a public relations service, to provide advertising of products and services of potential interest to the public, etc.

Figure 5:
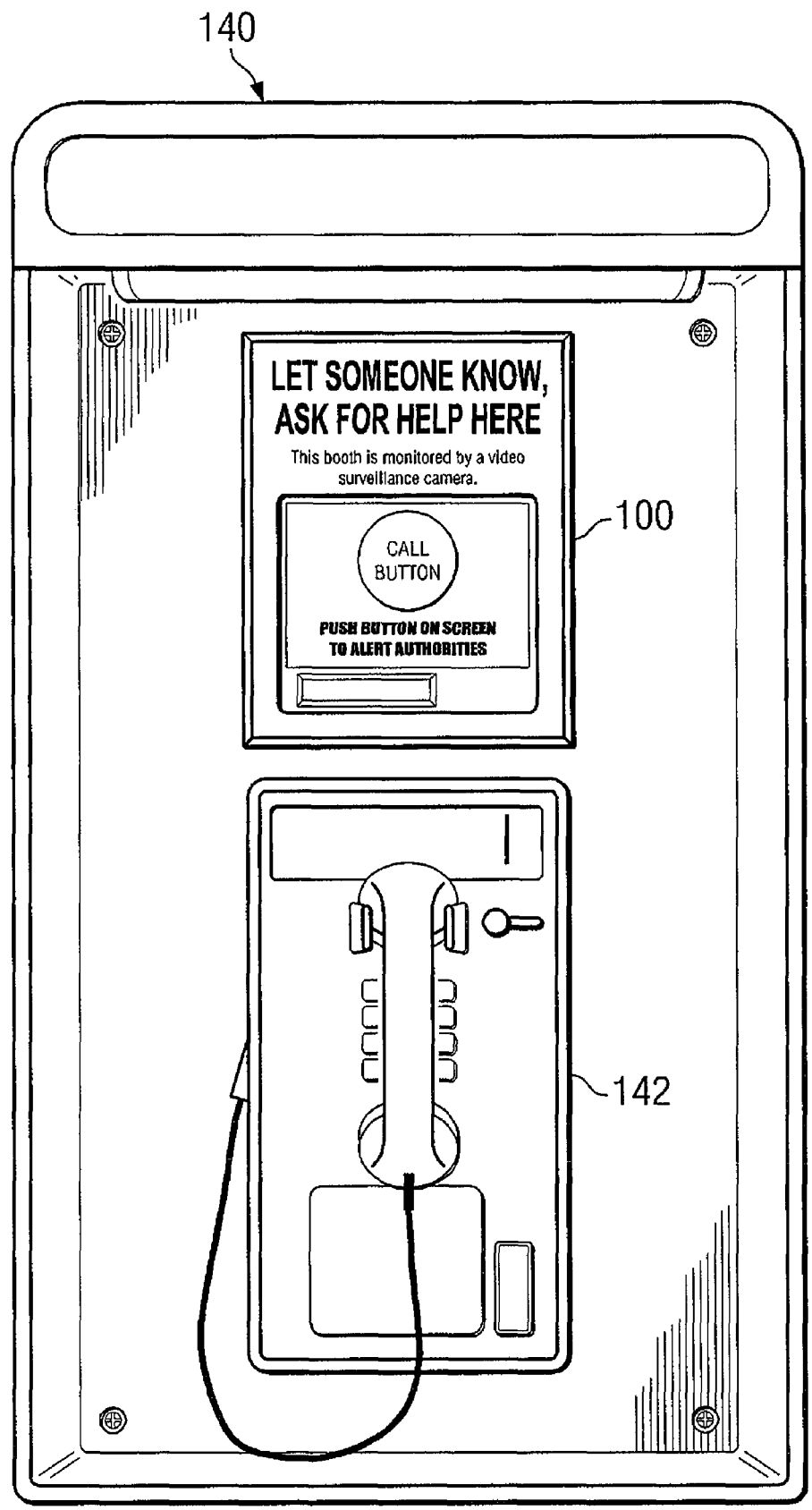
FIG. 5 illustrates a view of one embodiment of a call station according to the present invention as installed in a public phone booth.

FIG. 5 illustrates a view of one embodiment of a call station 14 according to the present invention as installed in a public phone booth 140. The call station display panel 100 is visible above a standard pay phone instrument 142 installed in the phone booth 140. In all respects, the call station shown in FIG. 5 is the same as the one illustrated in FIG. 3 and described herein above. In a similar embodiment of a call station 14 installed in a kiosk, the installation would be very similar to FIG. 3 but without the public pay telephone 142.

FIG. 6 illustrates a view of one embodiment of a call station 14 according to the present invention as installed in the passenger compartment of a public transportation vehicle such as a subway train car or light rail car 150. The call station display panel 120 is visible above a transit system map 152 of a metropolitan area installed in the interior of the subway car 150. In all respects, the call station 14 shown in FIG. 6 is the same as the one illustrated in FIG. 4 and described herein above.

FIG. 7 illustrates one embodiment of a sequence of display images that appear on the call station's touch screen display 18 of the embodiment of FIG. 2. The display is given reference number 102 in each of the illustrations of FIG. 7. Four screen images are shown, each image corresponding to a successive step in the very simple process of requesting assistance to an emergency situation, in response to the invitation on the call station 14 "LET SOMEONE KNOW, ASK FOR HELP HERE."

The first step 162 instructs the user reporting an incident to "Push button on screen to alert authorities." Executing this step is associated with initiating a request and may include storage of a corresponding record in memory in the processor 16 of the call station 14. In addition, upon touching the screen at the call button icon 106, the screen display 18 changes to a second graphic image in preparation for executing the second step 164. The second step 164 instructs the user to "Select one of the following by pressing [the] screen" at the statement that best identifies the kind of incident being reported for which assistance is requested. The choices are: Person in distress 170, Suspicious person 172, Suspicious package 174, Unlawful activity 176, and Safety concern 178. Upon selecting an incident type 170 to 178 by touching the screen display 18 at the position of the selected choice, a record corresponding to the selected incident identity may be stored in memory 16 of the call station 14 and the screen display 18 changes to a third graphic image in preparation for executing the third step 166. The third step 166 presents a graphic image showing a plurality of icons representing the kind of emergency services that are available, along with the instruction to "Select the help you need by pressing [the] screen" at the location on the screen display 18 of the icon that best identifies the kind of response that is required. Touching one of the icons may be associated with storing a record of the choice in memory 16 of the call station 14 and initiating a call to the selected service via a dial up connection through the telephone network 12.

Upon establishing the call, the records entered by the citizen may be retrieved from the memory 16 and transmitted to the called service, along with any other relevant information detected at the scene by sensors, camera, or microphone. In some embodiments the call is made (e.g., by the processor 16 under program control) by dialing a phone number to access, via wired or wireless network, a terminal, which then displays the message to an operator to confirm the request and relay the request to a response team, along with the data indicating the type of emergency, location, etc. The choices illustrated include "Request Fire Department 180," "Request Medical 182," and "Request Police 184." These services are represented by internationally recognized symbols for fire, medical, and police services. While only three examples of emergency response services are shown in the displayed image for the third step 166, other types of services that are available to the location of the call station 14 may be displayed. For example an evacuation assistance service might be accessible, such as shown in FIG. 8B to be described herein below. In an alternative embodiment, the call that is made may be a 911 call, wherein the particular steps and graphic displays may vary yet accomplish the same objective: to summon emergency assistance.

The entire process of entering the request takes only a few seconds to touch the screen display 18 three times in the sequence described so that the request may be forwarded almost as soon as it is entered. The request identifies the location (i.e., the address of the particular call station 14) in the call that is initiated at step 162 and sent automatically by the call station 14 when the second 164 and third 166 steps are completed. In one embodiment, a dialing program in the PC 16 of the call station 14 dials a phone number of the selected help needed. Upon answering, the system returns a message to the call station 14 that is displayed in step four 188, which states so that it may be read by the user "Your message has been received. HELP IS ON THE WAY."

It has been mentioned that the method and system of the present invention may be utilized to provide communication of information in several ways to meet a variety of emergency needs. The system as described herein above provides for requesting emergency services by relying on the telephone system to convey the communications. It is of course possible to implement the method and system of the present invention using the Internet as the principle communications medium, employing the basic structure illustrated in FIG. 1. It is only necessary to have all of the call stations and all of the service providers connected to the same network. The "same" network in this context can mean a single identified network or a system of linked networks having appropriate interfaces to enable them to function as one network in a particular circumstance. To provide an indication of the versatility of the present invention as an urban communication system (UCS), the FIGS. 8A, B, and C summarize and illustrate the comprehensiveness of the kinds of security services and information that can be processed and communicated by the system and method of the present invention. Each part of the series of FIGS. 8, A, B, and C, denote respectively the interactive, passive, and central control aspect or mode of the UCS system of the present invention. Further, while the method described in conjunction with FIG. 7 is illustrated for entering a request for assistance in an emergency situation, a similar sequence of calling steps, executed by touching successive displayed graphic images on a display located in an accessible, fixed, public place or facility, may be used to enter other kinds of requests for services such as retail sales and delivery, commercial ordering and delivery, requests for specific types of services such as taxicab or shuttle services, fast food orders, entertainment ticket orders, and the like.

Figure 8A:
FIG. 8A illustrates one embodiment of an interactive, pedestrian initiated aspect of a security mode of operation of the system from the call station.
Figure 8B:
FIG. 8B illustrates a second embodiment of a passive, monitoring aspect of the security mode of operation of the system at the call station.
Figure 8B:
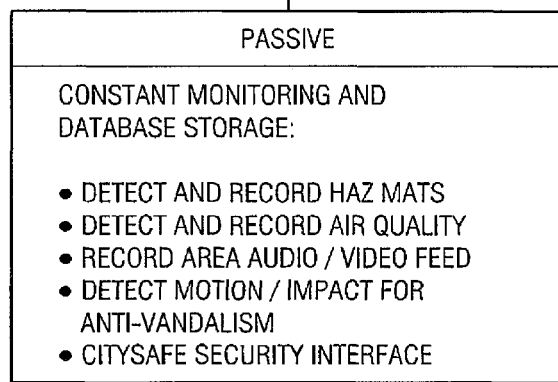

FIG. 8A illustrates one embodiment of an interactive, pedestrian initiated aspect of a security mode of operation of the system from the call station. Shown in FIG. 8A is a version of the second graphic image to be used for executing the second step 164 as it appears in the display 102. The call station panel 100 shown in the FIGS. 8A, B, and C is the same as illustrated in FIG. 3, in that the invitation reads "LET SOMEONE KNOW, ASK FOR HELP HERE." But in this example, the call station has capabilities beyond those described previously. Included below the panel 100 is a list 192 of interactive security functions that may be initiated by a pedestrian at the call station panel 100. The list 192 includes making a report about: a crime, a fire, an accident, a suspicious person or package, a person in distress, and an Amber sighting. This list 192 is illustrative and not exhaustive.

Similarly, FIG. 8B illustrates a second embodiment of a passive, monitoring aspect of the security mode of operation of the system at the call station. A version of the third graphic image for executing the third step 166 is depicted as it appears in the display 102. In this version, an evacuation service 186 is also shown along with the fire 180, medical 182, and police 184 services illustrated in FIG. 7. Further, some detailed instructions to the person at the call station may be written below the corresponding service icon in the displayed graphic image. Included below the panel 100 is a list 194 of passive security functions that may be initiated by a pedestrian at the call station panel 100. The list 194 includes constant monitoring and storage of data gathered at the call station location in a database through the microphone, camera, and sensor units, which function to detect and record hazardous materials, air quality measurements, motion and impact indications, and audio/video sequences. Other examples that could be in the list 194 of passive security functions include the data from sensors for detecting chemical, biological, or radiological substances or emissions.

FIG. 8C illustrates a third embodiment of a central control initiated aspect of the security mode of operation of the system from the central control facility. Shown in FIG. 8C is an example of a graphic image 190 for conveying security information of public interest to the call station. In this example, a missing child alert graphic is shown as it appears in the display 102. The alert may include a photo of a missing child and a query for the assistance of the public and some identifying information about the missing person. This example thus illustrates an important enhancement to the traditional phone booth utility, the ability to send information of public interest to the phone booth or kiosk from a central control facility connected to the same network as the call stations and emergency services. As is well understood, such booths are both very numerous and very widely distributed in populous metropolitan areas, enabling these facilities to function as variable billboards seen by great "numbers of eyes." Included below the panel 100 is a list 196 of central control initiated security functions that may be perceived or noticed by a pedestrian at the call station panel 100. The list 196 includes sending out information or notices such as missing child alerts, emergency alerts of all kinds, identities of a posting of descriptions of most wanted fugitives, and emergency instructions that are both visual and audible, and directed to the entire city, county or borough, or directed to a specific neighborhood, block, or residential or commercial unit.

In the example of the present invention described in the foregoing, for enabling a rapid request for emergency assistance, the use of the existing PSTN and installing call stations having the touch-responsive screen capability in existing telephone booth and transit car structures enables relatively low-cost installation and converts familiar, and widely known and used public facilities to enhanced functionality. As will be described, the enhanced functionality goes far beyond the provision of a system for requesting emergency assistance, however. Thus, the system of the present invention may also be utilized to provide non-emergency services, and the Internet network is particularly well adapted for that purpose. The illustrations of FIGS. 9A, B, and C to be described herein below present some examples of non-emergency or consumer-oriented applications that may utilize the present invention to advantage. Each part of the series of FIGS. 9, A, B, and C, denote respectively the interactive, passive, and central control aspect or mode of the UCS system.

For example, FIG. 9A illustrates one embodiment of an interactive, pedestrian initiated aspect of a consumer mode of operation of the system at the call station. In the display 102 of the call station panel 100 is a graphic image illustrating a variety of food, entertainment, tourism, transit, news report, or other resources that can be accessed from the call station 14 by merely touching the display 102 at the location of the graphic corresponding to the desired resource. Through interaction from the call station 14 with the desired resource, also connected to the same network, the pedestrian can obtain the desired information, service, or consumer item. Included below the panel 100 is a list 202 of interactive consumer functions that may be initiated by a pedestrian at the call station panel 100 of the present invention. The list 202 includes, in addition to the pedestrian-initiated security interface (i.e., generally, the UCS interface), such information portal functions as visual 411 directory assistance; neighborhood concierge (for maps, directions, event tickets, restaurants, stores, etc.); transit maps and schedules; weather, traffic, time and date information; photo cards; tourist information; web access and email; video calling; buy exclusive ring tones, winning lottery numbers, etc.

Figure 9B:
FIG. 9B illustrates a second embodiment of a passive aspect of the consumer mode of operation of the system from the central control facility.

Similarly, FIG. 9B illustrates a second embodiment of a passive aspect of the consumer mode of operation of the system initiated from and sent through the central control facility. Examples include the display of a commercial message regarding a product or service, a promotional message from a sponsor of the call station presenting the message, a public service message from a governmental or non-profit agency or organization, and the like. Included below the panel 100 is a list 204 of passive consumer functions that may be viewed but not initiated by a pedestrian at the call station panel 100 of the present invention. They are passive because they are not initiated from the call station 14. The list 204 includes the UCS interface, a banner advertisement, and an informational display.

Figure 9C:
FIG. 9C illustrates a third embodiment of a central control initiated aspect of a consumer mode of operation of the system from the control facility.
Figure 9C:
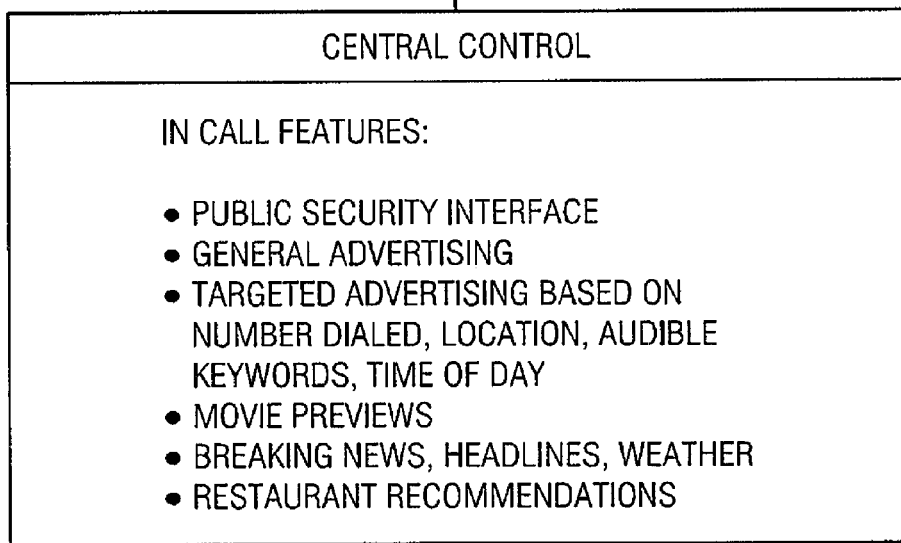

Further, FIG. 9C illustrates a third embodiment of a central control initiated aspect of a consumer mode of operation of the system initiated from the control facility. Examples shown in the display 102 of the call station panel 100 may include a transit map, ticket vendor ads, restaurant recommendations, etc. Included in FIG. 9C below the panel 100 is a list of information services that may be communicated to the call station 14 by central control, such as the UCS interface; general, or targeted advertising based on any of several parameters including number dialed, location, audible keywords, time of day, etc.; movie previews; breaking news, headlines, and weather; and restaurant recommendations.

Also identified in FIG. 9C (but also visible in all of the illustrations of FIGS. 8 and 9) are several features related to the sensor units that may be incorporated into the call station 14 of the present invention. The small openings 210, 212 may be lens elements of a pair of cameras, for example. The grills 214, 216 may be provided for acoustic coupling with a microphone or loudspeaker. Alternatively, the grills 214, 216 my provide a pathway for sensing air quality, motion, or the presence of chemical, biological, or radiological substances or emissions.

While the invention has been shown in only one of its forms, it is not thus limited but is susceptible to various changes and modifications without departing from the spirit thereof. For example, the illustrated embodiments include a call station that is affixed to a permanent structure such as a phone booth or kiosk, or mobile structures such as transit vehicles. Without departing from the spirit of the invention, the call station may also be implemented in portable form such as a personal communications device, or even as a feature incorporated into existing portable communications devices such as handheld computers, cellular telephones, and the like. The sequence of steps to place a call may be implemented for a wide variety of requests for service, for example in any request that can be reduced to a series of simple statements, in both emergency services and non-emergency services alike, by applying the principles embodied in the present invention.

What is claimed is:

1. A citizen call station, comprising:
   a housing permanently mounted in a public place;
   a memory system for storing program instructions and data;
   a video display supported on said housing and having a touch-responsive surface for entering a call sequence of statements including initiating an alert, selecting a concern, and selecting help needed;
   a program in said memory for displaying a graphic image on the video display representing each member of the call sequence of statements, said program including instructions for generating data for each graphic image and for generating data for displaying a touch-responsive button icon for entering said call sequence; and
   a communication mechanism coupled to the video display for transmitting the call sequence to a control location.

2. The citizen call station of claim 1, further comprising:
   a processor coupled to the memory system, the video display, and the communications mechanism, said processor operable to control the video display and the communication mechanism responsive to the program instructions and data stored in the memory system.

3. The citizen call station of claim 1, wherein the communications mechanism comprises:
   a receiving mechanism coupled to the video display for receiving and displaying a message acknowledging receipt of the transmitted call sequence.

4. The citizen call station of claim 3, wherein the displayed message includes a statement that the call sequence has been received and the help requested is on the way.

5. The citizen call station of claim 1, further comprising:
   at least one video camera operable with the communication mechanism for providing a live video feed of activity in the vicinity of the video display associated with the entered call sequence.

6. The citizen call station of claim 5, wherein the at least one video camera includes at least one component selected from the group consisting of a wide angle lens, a zoom lens, and a panning mechanism.

7. The citizen call station of claim 1, wherein the concern is selected from the group consisting of person in distress, suspicious person, suspicious package, unlawful activity, and safety concern.

8. The citizen call station of claim 1, wherein the help needed is selected from the group consisting of fire department, medical unit, police department, hazmat team, evacuation unit, and water department.

9. The citizen call station of claim 1, wherein the communication mechanism includes a communication network connecting the call station and the control location.

10. The citizen call station of claim 1, wherein the communication mechanism includes a direct subscriber line interface for coupling to the control location via an Internet.

11. The citizen call station of claim 1, wherein the communication mechanism includes a standard telephone interface for coupling to the control location via a telephone network.

12. The citizen call station of claim 1, wherein the communication mechanism includes a microphone, a loudspeaker, and associated circuitry to provide two-way voice communication with the control location or a service provider.

13. The citizen call station of claim 1, further comprising:
   a sensor mechanism selected from the group consisting of motion detector, smoke detector, air quality monitor, chemical sensor, biological organism sensor, and radiation detector installed in the vicinity of the video display associated with the entered call sequence;
   a circuit for coupling the sensor mechanism to the communication mechanism.

14. The citizen call station of claim 13, wherein the circuit comprises:
   a processor for processing information from the sensor mechanism into signals for input to the communication mechanism.

15. The citizen call station of claim 2, further comprising:
   a program stored in the memory system and operable on said processor for receiving data containing information provided by public agencies and commercial entities having utility for citizens interacting with the citizen call station.

16. The citizen call station of claim 15, wherein the information is selected from the group consisting of emergency instructions, an index of public services, public transportation schedules and fares, tourist information, entertainment venues and programs, restaurant and lodging information, special offers, promotional messages, sponsor's messages, and messages and information from civilian authorities and leaders.

17. A citizen call station, comprising:
   a housing permanently mounted in a public place;

a video display supported on said housing and having a touch-responsive surface for entering a call sequence of statements including initiating an alert, selecting a concern, and selecting help needed;

a communication mechanism coupled to the video display for transmitting the call sequence to a control location;

a memory system for storing program instructions and data;

a processor coupled to the video display, the communications mechanism, and the memory system, said processor operable to control the video display and the communication mechanism responsive to the program instructions and data stored in the memory system; and a program in said memory system for displaying a graphic image on the video display representing each member of the call sequence of statements; said program including instructions for generating data for displaying a touch-responsive button icon for entering said call sequence.

18. The citizen call station of claim 17, wherein the concern is selected from the group consisting of person in distress, suspicious person, suspicious package, unlawful activity, and safety concern.

19. The citizen call station of claim 17, wherein the help needed is selected from the group consisting of fire department, medical unit, police department, hazmat team, evacuation unit, and water department.

20. The citizen call station of claim 17, further comprising:

a program stored in the memory system and operable on said processor for receiving data containing information provided by public agencies and commercial entities having utility for citizens interacting with the citizen call station.

* * * * *